US012774771B2

(12) United States Patent
Manach et al.

(10) Patent No.: US 12,774,771 B2
(45) Date of Patent: Oct. 27, 2026

(54) ELECTRICALLY HEATED SUBSEA PIPELINES

(71) Applicant: SUBSEA 7 LIMITED, Sutton (GB)

(72) Inventors: Julien Manach, Milltimber (GB); Julien Verdeil, Suresnes (FR); Ratnam Sathananthan, Westhill (GB)

(73) Assignee: SUBSEA 7 LIMITED, Sutton (GB)

( * ) Notice: Subject to any disclaimer, the term of this patent is extended or adjusted under 35 U.S.C. 154(b) by 404 days.

(21) Appl. No.: 18/289,176

(22) PCT Filed: May 4, 2022

(86) PCT No.: PCT/GB2022/051138

§ 371 (c)(1), (2) Date: Nov. 1, 2023

(87) PCT Pub. No.: WO2022/234277

PCT Pub. Date: Nov. 10, 2022

(65) Prior Publication Data

US 2024/0369169 A1 Nov. 7, 2024

(30) Foreign Application Priority Data

May 4, 2021 (GB) ...................................... 2106341

(51) Int. Cl.

*F16L 53/38* (2018.01)
*F16L 53/34* (2018.01)
*F16L 59/14* (2006.01)

(52) U.S. Cl.

CPC ............... *F16L 53/38* (2018.01); *F16L 53/34* (2018.01); *F16L 59/143* (2013.01)

(58) Field of Classification Search

CPC .. F16L 53/34; F16L 53/38; F17D 1/05; F17D 1/18; H05B 1/0244; H05B 6/108; H05B 2214/02; H05B 2214/03

See application file for complete search history.

(56) References Cited

U.S. PATENT DOCUMENTS 6,564,011 B1 * 5/2003 Janoff ..................... F16L 53/38 392/479
9,651,183 B2 * 5/2017 Kristiansen ............... F17D 1/18

(Continued)

FOREIGN PATENT DOCUMENTS

CN 102160454 A * 8/2011 ........... H05B 1/0244
CN 104170522 A * 11/2014 ........... H05B 3/0009

(Continued)

OTHER PUBLICATIONS

International Search Report of PCT/GB2022/051138 dated Aug. 8, 2022.

(Continued)

*Primary Examiner* — Jennifer H Gay

(74) *Attorney, Agent, or Firm* — MATTINGLY & MALUR, PC

(57) ABSTRACT

An electric heating system for a subsea pipeline comprises heating sections disposed in neighbouring longitudinal succession. A switchboard is configured to supply power in a cycle alternating between the sections. Levels of heating power supplied to the sections are in mutually-opposed alternation throughout that cycle. During the cycle, a greater level of heating power is supplied to a first section than to a second section for a period of time. Conversely, a greater level of heating power is supplied to the second section than to the first section before and after that period. For example, the second section may be deactivated during that period and the first section may be deactivated outside that period.

23 Claims, 7 Drawing Sheets

(56) References Cited

U.S. PATENT DOCUMENTS

Figure 1:
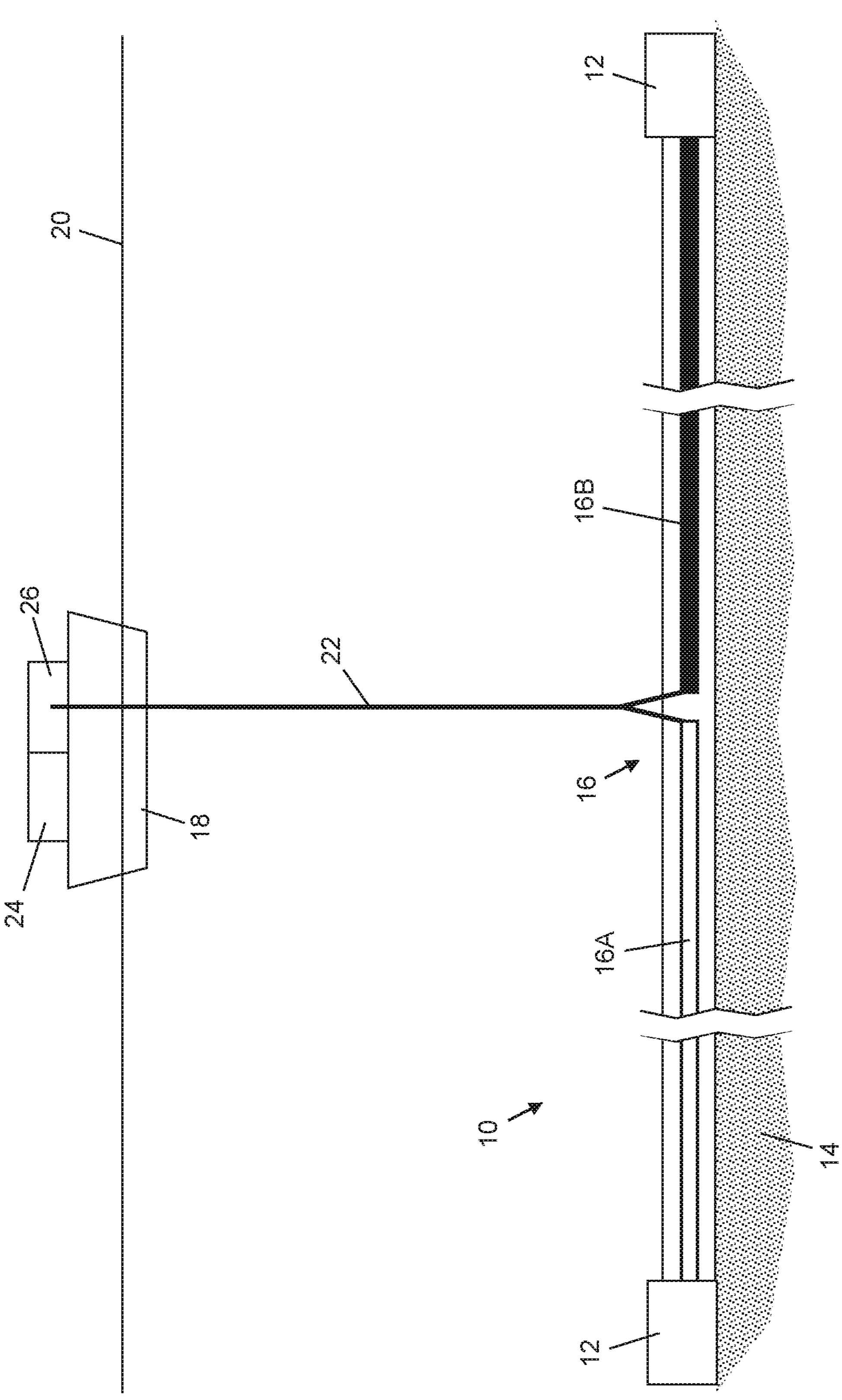

| | | | | |
|---|---|---|---|---|
| 10,030,801 | B2 * | 7/2018 | Radan | E21B 36/04 |
| 10,634,284 | B2 * | 4/2020 | Chakkalakal | F17D 3/01 |
| 10,704,005 | B2 * | 7/2020 | Aljindan | F16L 53/34 |
| 11,592,144 | B2 * | 2/2023 | Chakkalakal | F17D 3/01 |
| 11,859,596 | B2 * | 1/2024 | Chen | F01K 3/186 |
| 12,018,798 | B2 * | 6/2024 | Slater | F17D 1/18 |
| 12,474,022 | B2 * | 11/2025 | Song | F16L 53/34 |
| 12,535,190 | B2 * | 1/2026 | Thomas | F17D 3/01 |
| 2010/0084393 | A1 * | 4/2010 | Nolte | H05B 1/0244 219/494 |
| 2015/0016812 | A1 * | 1/2015 | Radan | H02J 3/26 392/478 |
| 2016/0018040 | A1 * | 1/2016 | Kristiansen | F16L 53/37 137/341 |
| 2019/0084016 | A1 * | 3/2019 | Strommegjerde | B08B 17/00 |
| 2019/0225902 | A1 * | 7/2019 | Aljindan | F17D 1/04 |
| 2019/0271440 | A1 * | 9/2019 | Slater | F17D 1/18 |
| 2022/0080470 | A1 * | 3/2022 | Strommegjerde | F16L 53/37 |
| 2022/0400536 | A1 * | 12/2022 | Allenspach | F17D 1/05 |
| 2023/0228245 | A1 * | 7/2023 | Chen | F03D 9/25 |
| 2024/0183500 | A1 * | 6/2024 | Song | F17D 3/01 |
| 2024/0369169 | A1 * | 11/2024 | Manach | F16L 53/37 |

FOREIGN PATENT DOCUMENTS

| | | | | | |
|---|---|---|---|---|---|
| CN | 118224536 | A | * | 6/2024 | F17D 3/01 |
| CN | 113228822 | B | * | 1/2025 | H05B 1/0244 |
| EP | 2624403 | A1 | * | 8/2013 | H02J 3/18 |
| GB | 2548096 | A | | 9/2017 | |
| GB | 2583942 | A | * | 11/2020 | H05B 1/0247 |
| KR | 102552619 | B1 | * | 7/2023 | E03B 7/12 |
| KR | 102906582 | B1 | * | 12/2025 | H05B 6/06 |
| WO | 2010/079318 | A1 | | 7/2010 | |
| WO | 2013/124270 | A1 | | 8/2013 | |
| WO | WO-2013113430 | A2 | * | 8/2013 | H02J 3/18 |
| WO | WO-2013188012 | A1 | * | 12/2013 | F24H 1/142 |
| WO | WO-2019122718 | A1 | * | 6/2019 | F17D 1/18 |

OTHER PUBLICATIONS

International Preliminary Report on Patentability of PCT/GB2022/051138 dated Jul. 11, 2023.

* cited by examiner

ELECTRICALLY HEATED SUBSEA PIPELINES

This invention relates to the heating of subsea pipelines that are used in the production of hydrocarbon fluid. The objective of heating is to avoid a pipeline becoming clogged or plugged with solids that may otherwise appear in the fluid if its temperature falls too low within a given pressure range. The invention is particularly concerned with the problem of reducing the electrical power that is required to heat a subsea pipeline for flow assurance.

Oil and gas are present in subterranean formations at elevated temperature and pressure, which may be increased by the injection of fluids such as pressurised water or steam. On production of oil or gas from subsea fields, the hot production fluid emerges from a subsea wellhead and enters a subsea pipeline in a multiphase state. The production fluid then flows in the pipeline across the seabed and eventually flows up a riser to the surface.

Low temperature increases the viscosity of the production fluid and promotes coalescence or precipitation of solid-phase materials from some components present in the fluid, namely waxes and asphaltenes in crude oil and hydrates in natural gas, which may also be present with oil. Such solid-phase materials tend to deposit and accumulate on the inner wall of the pipeline and may eventually cause plugs, which will interrupt production. Aside from the high cost of lost production, plugs are difficult and expensive to remove and can even sever a pipeline.

During transportation along a pipeline, the temperature and pressure of the production fluid have to be kept high enough to ensure a sufficient flow rate across the seabed and up a riser. In particular, various measures are taken to ensure that the internal temperature of the pipeline remains high despite thermal exchange with the surrounding seawater, which is invariably much colder.

Maintaining a sufficient temperature in a flow of hydrocarbons is straightforward while the hot flow continues but it becomes critical during a shutdown period. In this respect, all or part of a subsea oil or gas field must occasionally be shut down for maintenance. Shutdown may also occur on an unplanned basis in the event of an equipment failure or other anomaly. During shutdown, production is stopped and therefore hot production fluid no longer flows through the pipeline.

If the flow of production fluid stops for any reason, the temperature of the fluid left within the pipeline will decrease due to thermal exchange with the surrounding water. Plugging becomes a risk if the temperature of the production fluid within the pipeline drops below the wax appearance temperature (WAT), or below other thresholds at which other solid materials will coalesce from oil or gas, notably the hydrate appearance temperature (HAT). Also, when production restarts, temperature within the pipeline must be increased quickly so that no plugs will form.

Designers of subsea pipelines have adopted both passive and active approaches to thermal management, both individually and in combination. Passive thermal management involves retaining heat in the production fluid whereas active thermal management involves adding heat to the production fluid to replace heat that is inevitably lost to the surrounding water. In principle, heating can be used for remediation after the appearance of wax or hydrates but the main objective is to keep the production fluid above the WAT and HAT.

In passive thermal management systems, a pipeline is thermally insulated. One example of a passive system is a pipe-in-pipe (PiP) structure comprising a fluid-carrying inner pipe positioned concentrically within an outer pipe. The inner and outer pipes are spaced from each other to define an insulating annulus between them. Typically, thermally-insulating material is disposed in the annulus; it is also possible to draw down a partial vacuum in the annulus to reduce transmission of heat through the annulus.

Among active thermal management systems, a trace heating system employs resistive electrical wires or cables running along, and in thermal contact with, the outer surface of a steel pipeline. Typically, triplets of cables define respective three-phase heating circuits, for example up to twelve circuits hence comprising a total of thirty-six cables distributed around the pipeline. Heat produced by the Joule effect upon passing an electric current along the cables is conducted through the pipe wall to the production fluid flowing within. Alternatively, the cables may heat the adjacent pipe wall by induction. For example, in skin-effect heating, an inductive ferromagnetic tube containing a cable is laid along the pipeline.

Conventionally, heating cables of electrically heated subsea pipelines are disposed within the annulus of a PiP structure against the outer surface of the inner flowline pipe, buried beneath a surrounding layer of thermal insulation material in the annulus.

Direct electrical heating (DEH) of steel pipelines is also common. A DEH system is so called because the steel flowline wall is heated directly by a current that flows through it. For this purpose, a power cable is connected to a flowline pipe and may conveniently be installed in piggyback relation to the pipe. Single-phase alternating current flows along the cable and back through the pipe wall, which serves as an electrically-conductive impedance. The alternating current heats the wall of the pipe by a combination of Joule and skin effects, which in turn heats the production fluid. The temperature of the production fluid can therefore be controlled by varying that current.

A power distribution switchboard for an electrical heating system may be located subsea on the seabed or topside on a host installation at the surface, typically on an offshore installation such as a platform or an FPSO (floating production, storage and offloading) vessel. Ultimately, though, all electrical heating systems for subsea pipelines require a power supply from the topside host installation.

Power production and transformation require dedicated, bulky topside equipment where space is often at a premium. Power transmission also requires an expensive umbilical extending between the surface and the seabed, with a large cross-section and a complex structure that may include multiple slip rings. Energy consumption and emissions involved with power generation are also a consideration.

An objective of the invention is to minimise the power requirement of a pipeline heating system, in which case all of the above drawbacks can be mitigated. In particular, the topside equipment and the umbilical can be made smaller, simpler and less expensive, for example by reducing the cross-section of, and the number of slip rings in, the umbilical. These benefits can be particularly important when exploiting brownfield developments where production is plateauing or declining, and where cost-effective solutions are therefore necessary to extend the life of the field.

The prior art includes DEH systems in which multiple sections of pipeline are powered independently. For example, WO 2010/079318 discloses a daisy-chain arrangement of successive DEH sections and in WO 2013/113430, the phases of multiple DEH units powered from the same topside installation are synchronised by a load-balancing technique known as ‘symmetration’.

In WO 2013/188012, temperature sensors are arranged on distinct sections of DEH pipeline. Whilst heating of sections is regulated by virtue of temperature measurements, the power supply and transmission equipment has to be capable of powering all of the sections simultaneously. Similarly, self-regulating trace heating, where a temperature sensor is used to adapt the heating power to achieve a desired outcome, is also known in the art.

GB 2548096 discloses a ‘cold flow’ system and method in which fluid in a pipeline is actively cooled to the temperature of the surrounding seawater in order to encourage the formation of solid deposits that are washed along with flow of fluid in the pipeline. In order to prevent build-up of deposits on the walls of the pipeline, the walls are periodically heated to release deposits that are attached to the walls.

WO 2013/124270 also relates to direct electrical heating of subsea pipelines carrying fluid hydrocarbons.

None of this prior art addresses the problem solved by the invention. Consequently, the prior art does not enable a radical reduction in the power requirement of a subsea heating system and a corresponding reduction in the size, complexity and cost of the topside equipment and the umbilical.

Against this background, the invention resides in a method of operating an electric heating system having at least first and second sections disposed in neighbouring longitudinal succession along a subsea pipeline. The method comprises, in an alternating cycle: for a period of time, supplying greater heating power to the first section than to the second section; and before and after that period, supplying greater heating power to the second section than to the first section. The levels of heating power supplied to the first and second sections are in mutually-opposed alternation throughout the cycle. Aggregate power supplied to the system may therefore be maintained at a substantially constant level throughout the cycle.

The second section may be deactivated during said period and the first section may be deactivated before and after said period. Alternatively, heating power may continue to be supplied to the second section during said period and to the first section before and after said period.

Where the temperature of fluid within or flowing from the pipeline is measured, the timing of the cycle or the levels of heating power supplied to the first and second sections may be adjusted in response to the measured temperature.

In a transition at the beginning of said period, heating power supplied to the first section may be increased while heating power supplied to the second section is reduced. Similarly, in a transition at the end of said period, heating power supplied to the first section may be reduced while heating power supplied to the second section is increased.

More generally, varying levels of heating power may be supplied to the first and second sections throughout the cycle. Alternatively, the level of heating power supplied to the first section may be substantially constant throughout said period. Similarly, the level of heating power supplied to the second section may be substantially constant immediately before and after said period. However, a greater maximum level of heating power may be supplied to the first section than to the second section.

The inventive concept also embraces a corresponding electric heating system for a subsea pipeline, the system comprising: at least first and second heating sections that are disposed in neighbouring longitudinal succession along the pipeline; and a switchboard that is configured to supply power in a cycle alternating between the first and second sections, in which cycle a greater level of heating power is supplied to the first section than to the second section for a period of time, and a greater level of heating power is supplied to the second section than to the first section before and after that period. The switchboard may be located on a surface installation or at a subsea location and may be configured to operate the cycle autonomously.

The inventive concept extends to a subsea pipeline that includes at least one heating system of the invention. At least one temperature sensor may be mounted on or positioned downstream of the pipeline and may be connected to the switchboard to send production fluid temperature feedback to the switchboard. The switchboard may be configured to respond to that feedback by adjusting the timing of the cycle and/or by adjusting the levels of heating power supplied to the first and second sections.

The inventive concept also covers an offshore hydrocarbon production installation comprising at least one pipeline of the invention. In such an installation, the heating system may be powered via an umbilical that extends from a power unit at the surface and connects to the heating system. Such an umbilical may conveniently connect to the heating system between the first and second sections.

In summary, the invention contemplates intermittent heating of sections of a subsea flowline to limit power consumption and to reduce the size of the associated electrical distribution system. Reduction of the power requirement for the flowline heating system beneficially reduces the size of the electrical distribution system, including the cross-section of a subsea umbilical. This improves the prior art approach of using a high-power distribution system including a large, complex and correspondingly expensive umbilical.

The invention provides a method of operation of electrical heating systems for subsea flowlines, based on intermittent heating, that optimises the design and power consumption of such systems. This intermittent heating method is implemented in a heating system that is divided into two or more sections along the flowline. Dividing an active heating system into sections is known, but the standard method of operating such heating systems involves activating all of the sections at the same time.

In particular, with a heated pipeline comprising first and second sections of trace-heated flowline, the prior art teaches supplying the same level of power to a given number of cables or triplets in a first section and to the same number of cables or triplets in a second section at the same time. With the new concept of the invention, each section may be heated alternately for a defined duration and to a defined heating power. So, in contrast to the prior art, the method of the invention proposes to alternate power levels between the sections.

Thus, in accordance with the invention, power may be supplied to a given number of cables or triplets in the first section, which may be the same number of conductors as in the prior art mode described previously, for a period of time. Then, the power supply to that first section may be switched off, and power may instead be supplied to the second section for a period of time and so on. This principle can be applied to as many sections as is relevant for the project development and so is not limited to two sections.

The principle of the invention exploits the thermal inertia of the production fluid and of the pipe itself and will work with any production fluid comprising gas, oil and/or water. In theory, the overall power requirement with this method of operation can be approximately half that of a conventional method. In practice, however, overall power input can be set at any level that may be necessary to provide a required degree of flow assurance while also achieving a worthwhile saving in the overall power requirement.

The design of the power distribution system is based on the maximum heating power required, allowing for defined spares and redundancy. As the invention allows the design of the power supply to be based on a much lower power requirement, the result is a major saving in the hardware cost. The biggest cost saving may arise from a reduction of the cross-section of the power umbilical. These cost savings introduce major benefits especially for, but not limited to, reducing the topside space requirement, and the number of slip rings.

The invention can be used in three main modes of operation as follows. For each mode, the number of active triplets or cables or the power supplied to a DEH cable is defined by the flow assurance requirement.

In a maintenance mode, a DEH cable or a number of triplets or cables are active to keep the temperature of the production fluid above the HAT during a production interruption.

In a heat-up mode, the DEH cable or a number of triplets or cables are active to warm up the product after a long flow interruption which led the production fluid temperature to go below the HAT, close to the ambient temperature of the surrounding environment.

In a continuous heating mode, the DEH cable or a number of triplets or cables is active to maintain a required temperature in the production fluid and to keep a desired flow rate for a defined period of time. The target temperature is based on both the WAT and the HAT, whichever is higher.

Embodiments of the invention implement a method to heat at least two successive sections of electrically heated pipeline, the method comprising alternately heating each section in turn for a time duration while power supply is reduced or nullified in another of the sections.

Electrical heating may be effected by any one of, or any combination of, trace heating, direct electrical heating (DEH) or induction heating.

The power cables of two successive sections may be connected by a switchboard, which may be located subsea. In that case, the switchboard may be controlled remotely from the surface. The switchboard may instead be pre-programmed to operate automatically or autonomously.

The time duration of heating may be determined by measuring and responding to temperature in the corresponding pipeline section. The time duration may instead be predetermined for reaching a target temperature, based on the thermal performance or U-value of the pipeline.

Embodiments of the invention also provide an electrically trace heated pipeline comprising: at least two separate sections of trace heating cables along the surface of the pipeline; and a switchboard connecting and controlling the sections of trace heating cables.

The switchboard may be automated and may deactivate or reduce heating power in a section when heating of the other, or another, section is activated or when heating power in that other section is increased. Deactivation or a reduction of heating power in one section is synchronised or coordinated with activation or an increase of heating power in another section. In this way, the aggregate power consumption is always substantially lower than if both of those sections were activated to the same or a similar power level simultaneously, as in the prior art.

The pipeline may comprise at least one layer of thermal insulation around the trace heating cables. The pipeline may have a pipe-in-pipe configuration, with the trace heating cables being disposed inside the annulus. The annulus may also contain at least one layer of thermal insulation material and/or a low-pressure gas.

In summary, the invention provides an electric heating system for a subsea pipeline, which system comprises heating sections disposed in neighbouring longitudinal succession along the pipeline. A switchboard is configured to supply power in a cycle alternating between the sections. Levels of heating power supplied to the sections are in mutually-opposed alternation throughout that cycle.

During the cycle, a greater level of heating power is supplied to a first section than to a second section for a period of time. Conversely, a greater level of heating power is supplied to the second section than to the first section in preceding and succeeding periods. For example, the second section may be deactivated during a period and the first section may be deactivated outside that period.

By applying heat to successive portions of the pipeline in this intermittent or fluctuating manner, the overall power requirement of the system is greatly reduced without impacting on flow assurance. There is a corresponding reduction in the size, complexity and cost of power generation and transmission hardware.

Figure 2:
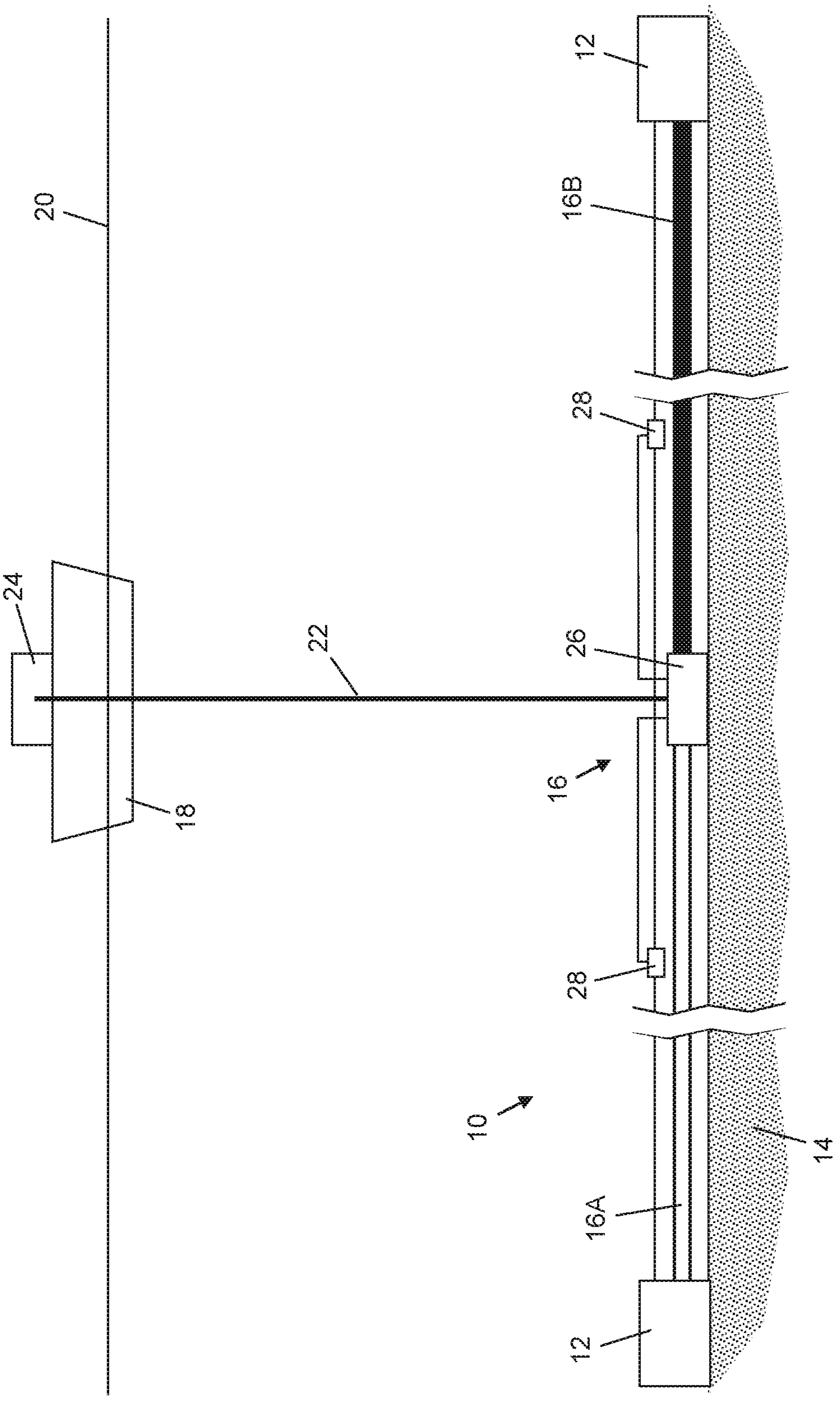
Figure 3A:
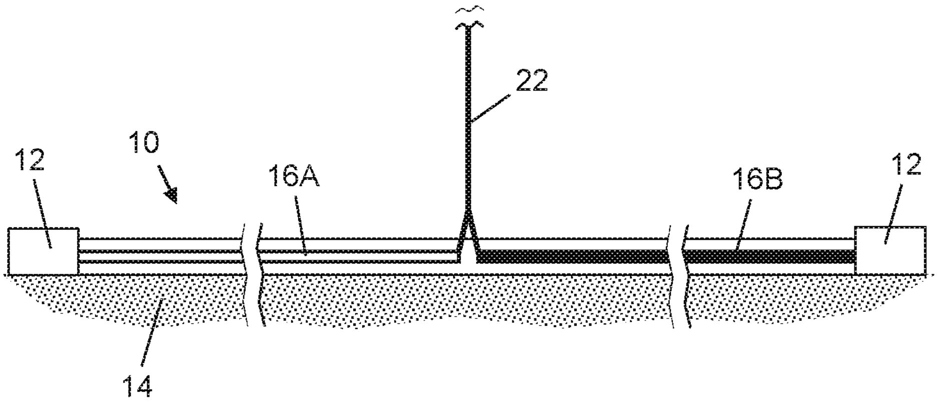
Figure 3B:
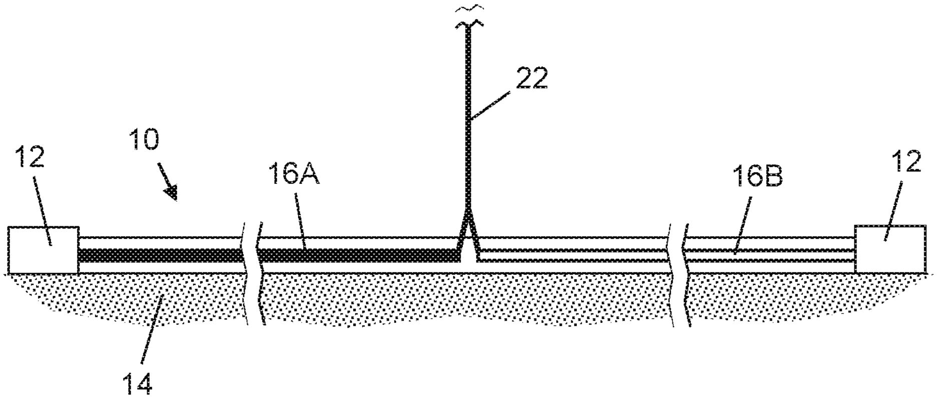
Figure 3C:
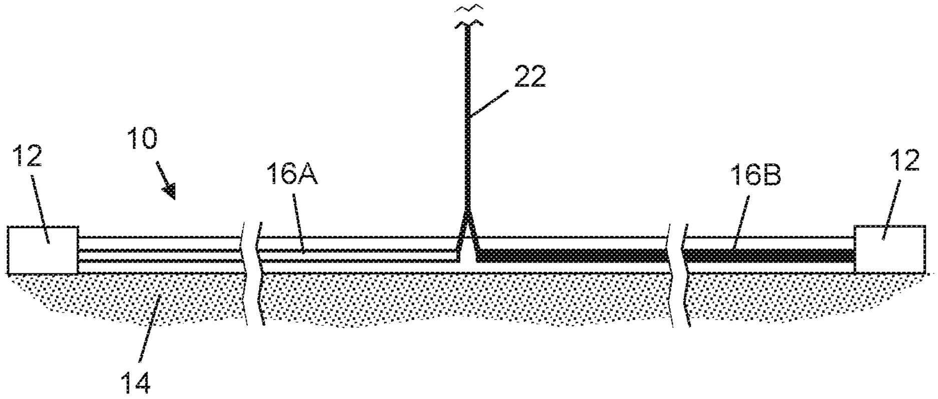
Figure 4A:
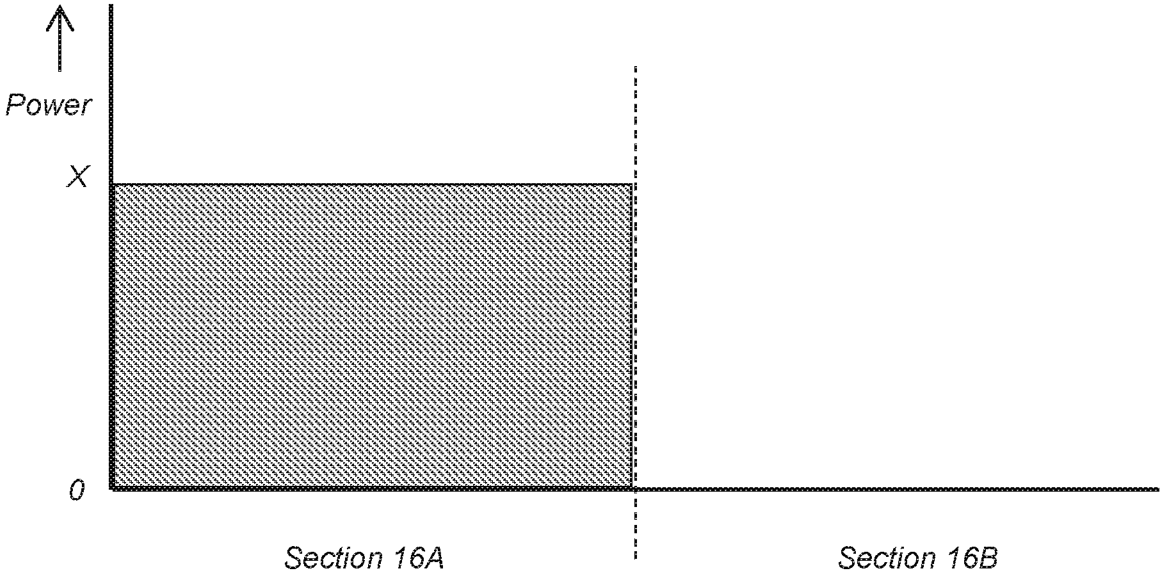
Figure 4B:
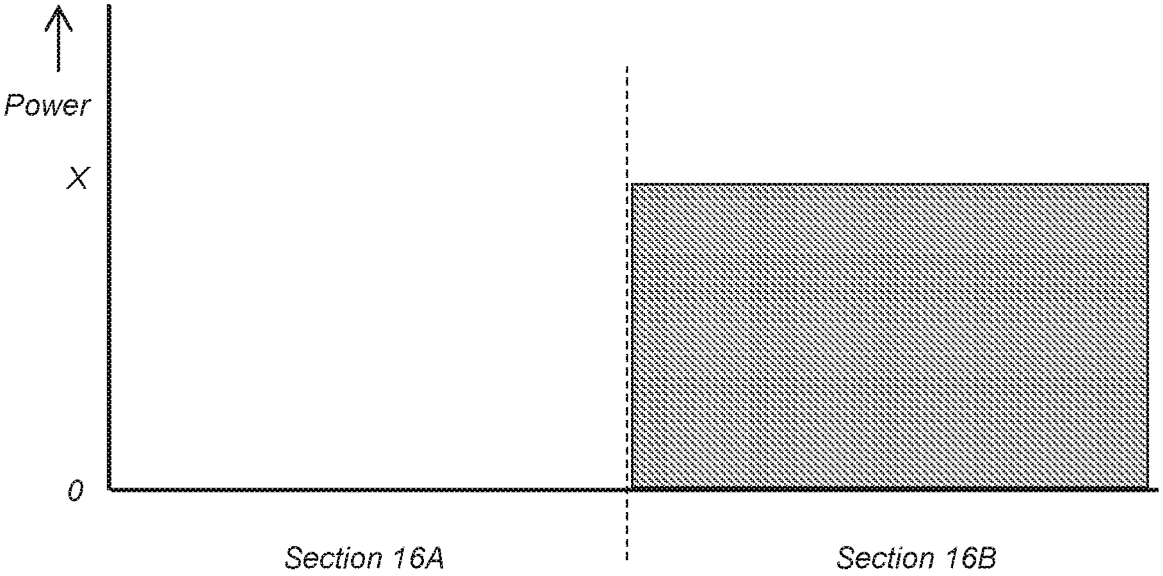
Figure 5A:
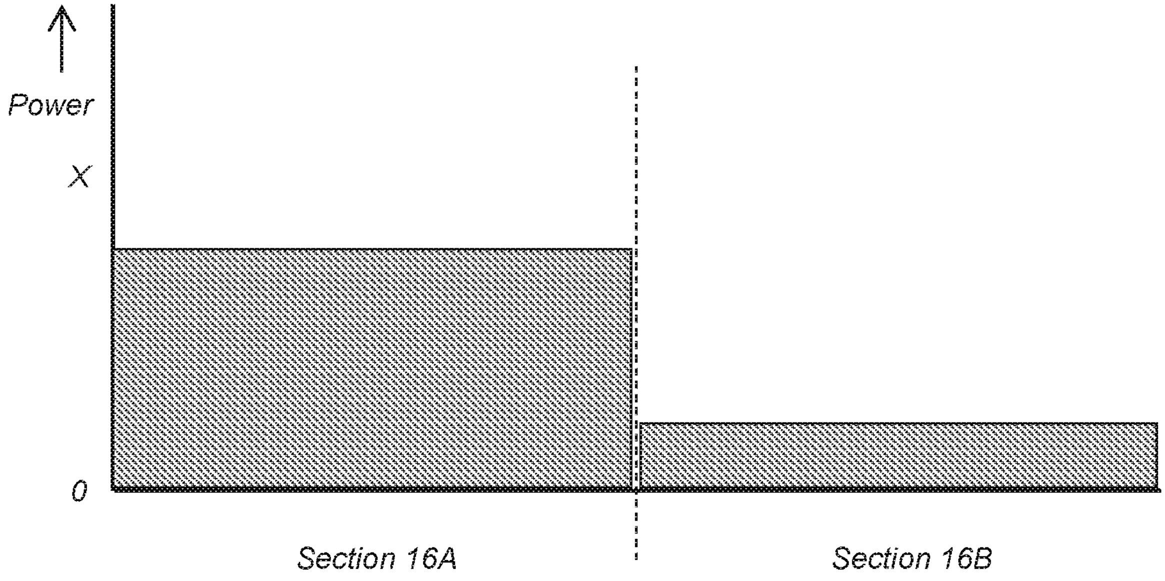
Figure 5B:
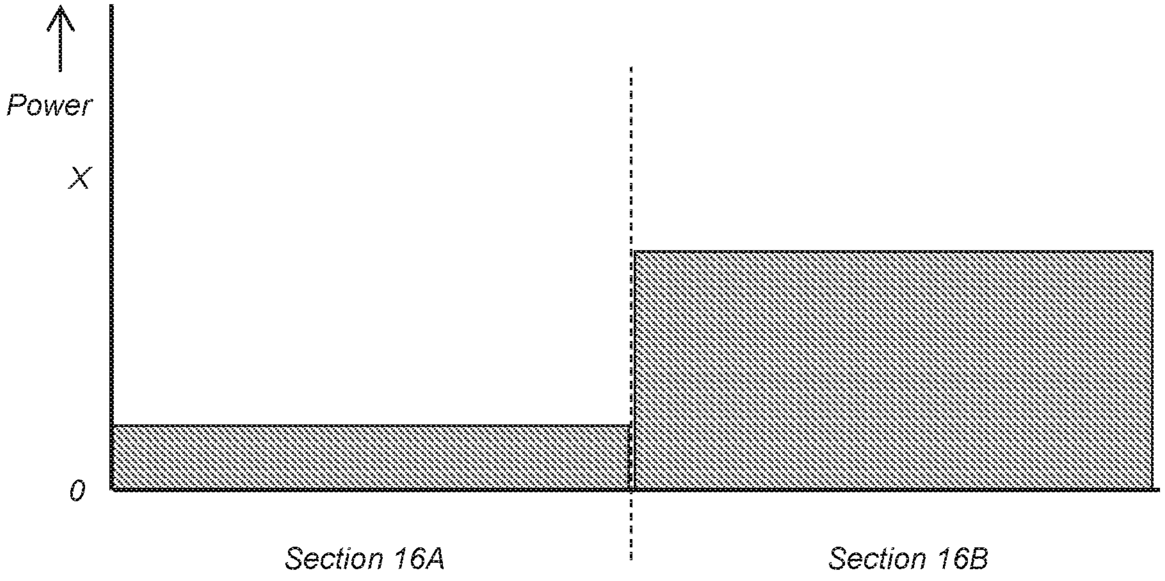
Figure 6:
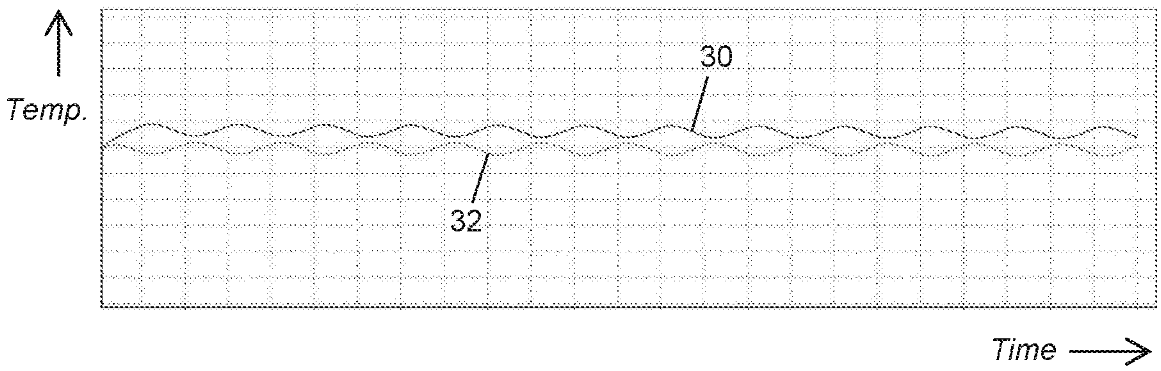
Figure 7:
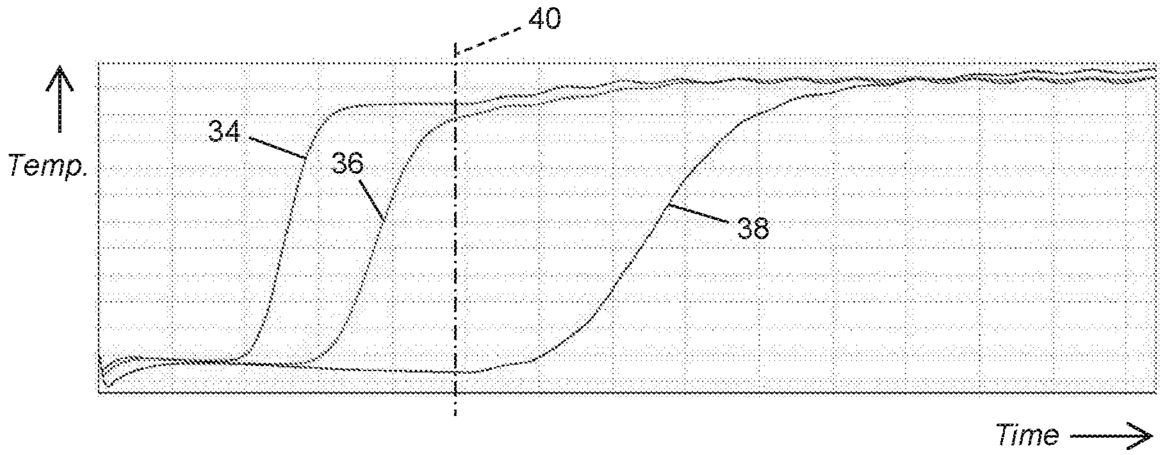
Figure 8A:
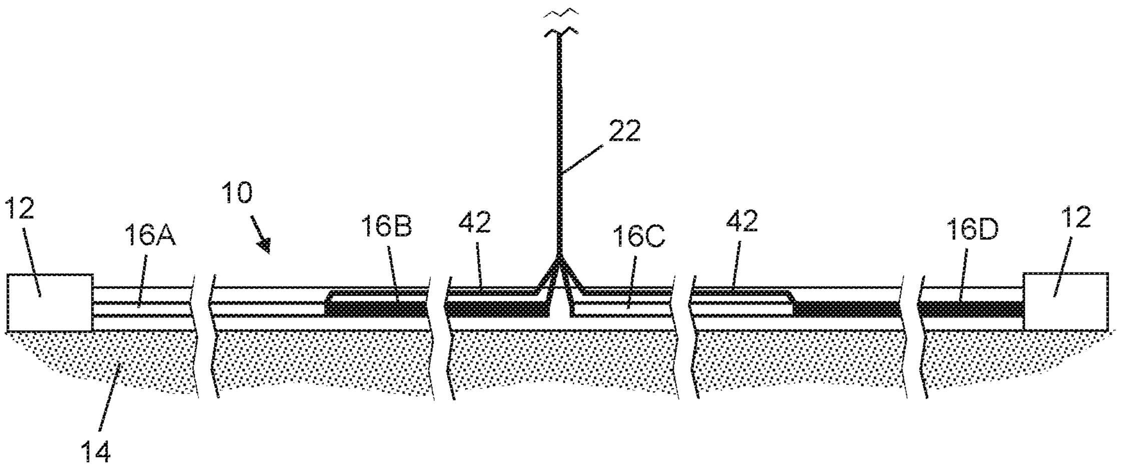
Figure 8B:
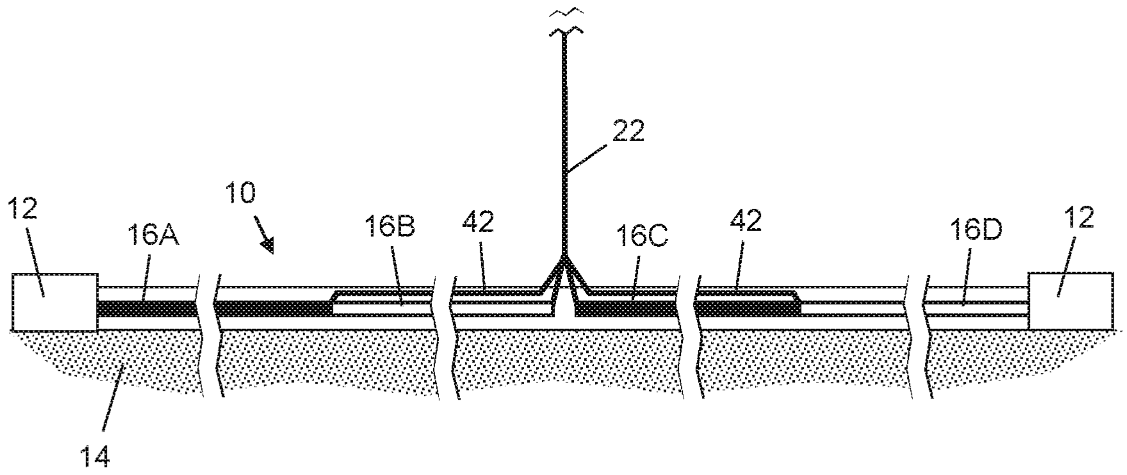

In order that the invention may be more readily understood, reference will now be made, by way of example, to the accompanying drawings in which:

FIG. 1 is a schematic side view of an electrically heated subsea flowline of the invention, including a power distribution switchboard located topside on a surface installation;

FIG. 2 corresponds to FIG. 1 but shows a variant in which the power distribution switchboard is located instead on the seabed beside the flowline;

FIGS. 3*a*, 3*b* and 3*c* are detail views of the arrangement shown in FIG. 1, showing power being switched in alternation between heating sections on longitudinally-successive portions of the flowline;

FIGS. 4*a* and 4*b* are graphs showing relative heating power levels applied to adjoining portions of a pipeline in successive time periods, with the power applied to each portion being cyclically activated and deactivated in mutual alternation;

FIGS. 5*a* and 5*b* correspond to FIGS. 4*a* and 4*b* but show the heating power applied to each portion instead being cyclically increased and reduced in mutual alternation;

FIG. 6 is a graph of temperature against time showing typical heating cycles for two portions of heated flowline of the invention in maintenance mode;

FIG. 7 is a graph of arrival temperature against time showing typical heating cycles for a heated flowline of the invention in continuous heating mode, for three different flowrates; and FIGS. 8*a* and 8*b* are schematic detail side views showing the operation of a variant of the arrangement shown in FIG. 1, in which the flowline has four longitudinally-successive portions with respective heated sections powered in alternation.

Referring firstly to FIGS. 1, 2 and 3*a* to 3*c*, a heated subsea pipeline 10 extends between terminal modules 12 on the seabed 14. Subsea structures upstream and downstream of the terminal modules 12 have been omitted for clarity.

The pipeline 10 is fitted with an electrical heating system 16, which may be a DEH system, a trace heating system or an inductive system. In this example, the heating system 16 is a trace heating system that is divided into a first section 16A and a second section 16B extending along respective portions of the pipeline 10 in longitudinal succession. By way of example, each section 16A, 16B may be ten kilometres in length, and may input heating power to the pipeline 10 at ten watts per linear metre.

Where the heating system 16 is a trace heating system or an inductive system, heating cables of the system 16 may extend along the thermally-insulating annulus of a PiP pipeline 10 comprising an inner pipe and an outer pipe in coaxial relation. The heating cables could extend longitudinally along the inner pipe or could wind helically around, or undulate along, the inner pipe instead. In a heating system 16 powered by triphasic alternating current, the heating cables may be grouped in triplets terminating in star ends, which may for example be positioned on or adjacent to the terminal modules 12.

The heating system 16 is powered from a topside installation exemplified here by an FPSO 18 floating at the surface 20, connected to the heating system 16 by a power umbilical 22 hanging from the FPSO 18 toward the seabed 14. Conveniently, the power umbilical 22 may connect to the heating system 16 at a central location between the sections 16A, 16B as shown.

In practice, the FPSO 18 will receive production fluid from the pipeline 10 via a riser system and will be moored to the seabed by multiple mooring lines but a riser system and moorings have been omitted from the drawings for clarity. The umbilical 22 could be supported by or integrated into a riser system, and may have any suitable configuration such as a catenary configuration.

The FPSO 18 has an onboard power unit 24 that generates electrical power at a required voltage and frequency. A switchboard 26 is interposed between the power unit 24 and the sections 16A, 16B of the heating system 16 to control the distribution of that power between the sections 16A, 16B, and to control the level and timing of the power that is supplied to each section 16A, 16B.

In FIG. 1, the switchboard 26 is situated onboard the FPSO 18 above the surface 20 whereas the variant of FIG. 2 shows the switchboard 26 situated subsea, in particular on the seabed 14 beside the pipeline 10.

The variant of FIG. 2 also shows the option of temperature sensors 28 on the portions of the pipeline 10 that are heated by the respective sections 16A, 16B of the heating system 16. The temperature sensors 28 feed signals to the switchboard 26 representing the temperature of the production fluid in their portions of the pipeline 10. The switchboard 26 responds to those signals by adjusting power levels, or time periods at given power levels, in the associated sections 16A, 16B of the heating system 16. The objective is to attain, or to maintain, a target temperature in the production fluid. As noted previously, the target temperature may vary depending upon whether the system is in a maintenance mode, a heat-up mode or a continuous heating mode.

The temperature sensors 28 of FIG. 2 could also be used in the arrangement shown in FIG. 1, feeding signals back up the umbilical 22 to the switchboard 26 onboard the FPSO 18. The switchboard 26 will then respond by adjusting the power transmitted back down the umbilical 22 to the sections 16A, 16B of the heating system 16.

In accordance with the invention, the switchboard 26 is configured or controlled to activate and deactivate the adjoining sections 16A, 16B of the heating system 16 in alternation. This alternation is represented schematically in the drawings by showing the activated section 16A or 16B as black and the deactivated section 16A or 16B as white.

FIGS. 3*a* to 3*c* correspond to a detail of FIG. 1, omitting the FPSO 18 with its onboard power unit 24 and switchboard 26, and the temperature sensors 28 of FIG. 2. They show the alternating activation of the invention as a sequence. Specifically, in FIG. 3*a*, section 16B is activated while section 16A is deactivated. In FIG. 3*b*, section 16B is deactivated while section 16A is activated. In FIG. 3*c*, the system returns to its previous state in which section 16B is activated and section 16A is deactivated. This alternating cycle continues throughout operation of the pipeline 10 as it conveys production fluid between the terminal modules 12.

The cyclical period of each activation and deactivation of a section 16A, 16B can be predetermined by inferring that, for a pipeline 10 with known thermal characteristics such as U-value and a production fluid at a theoretically known temperature at the wellhead, a given power input over that period will result in in the production fluid being maintained within a given temperature range. Alternatively, where temperature sensors are provided as in FIG. 2, the switchboard 26 can respond to feedback by adjusting the power levels and/or the time periods at particular power levels to maintain the production fluid within a desired temperature range. As another option, temperature of the production fluid can be measured only onboard the FPSO 18 and the temperature of the production fluid inside the pipeline 10 can be inferred from that value.

Turning now to FIGS. 4*a*, 4*b*, 5*a* and 5*b*, these graphs show heating power input to each section 16A, 16B in successive time periods of an alternating cycle. FIGS. 4*a* and 4*b* show a scenario in which power in each section 16A, 16B is activated and deactivated in turn, maintaining a substantially constant overall power requirement marked as X on the vertical axis. The power requirement X will be considerably lower, in principle half of, the aggregate power requirement if both sections 16A, 16B were instead activated simultaneously to similar power levels as in the prior art.

FIGS. 5*a* and 5*b* show a scenario in which power in each section 16A, 16B is increased and reduced in turn. Thus, neither section 16A, 16B is ever completely deactivated, but their levels of activation expressed in terms of power input fluctuate in dependence on, and in opposed relation to, each other. The aggregate power input to the sections 16A, 16B at any one time remains X as marked on the vertical axis, hence maintaining the same substantially constant overall power requirement at a level considerably below that of the prior art.

FIGS. 6 and 7 model the effect of power fluctuation of the invention on the temperature of production fluid flowing along the pipeline 10. Here, time is expressed on the horizontal axis, with transitions of heating power between sections 16A and 16B every hour. Temperature is expressed on the vertical axis in units of degrees Celsius.

In FIG. 6, which shows the system in a maintenance mode, line 30 shows the average temperature of the production fluid in an upstream section 16A of the pipeline 10 and line 32 shows the average temperature of the production fluid in a downstream section 16B of the pipeline 10. Time is expressed here in units of one hour. It will be noted that the temperature of the production fluid in each section 16A, 16B fluctuates sinuously over time, with a period of one hour between peaks and troughs as heating is activated and deactivated, while remaining within a narrow range of less than one degree Celsius.

Line 32 reflects a slightly lower average temperature than line 30 due to heat loss to the environment as the production fluid flows along the pipeline 10, assuming the same level of heating power input to the respective sections 16A, 16B. In practice, heating of section 16B could be increased relative to heating of section 16A to compensate for this.

FIG. 7, which shows the system in continuous heating mode, is a graph of arrival temperature of the production fluid after transiting the pipeline 10 against time in five-hour units following start-up of flow following a shut-down period. The lines 34, 36, 38 reflect three different flowrates of the production fluid, from a slower flowrate combined with lower power input in line 34 to a higher flowrate in line 38. For a given level of heating power input, shown in line 36 and line 38, the threshold temperature is therefore attained more quickly in line 36 than in line 38.

After allowing a period of twenty-four hours from start-up, represented by the dashed vertical line 40 in FIG. 7, the system of the invention is switched on to alternate heating between successive sections 16A, 16B of the pipeline 10. Minor fluctuations in the arrival temperature ensue as the system cycles between its modes of activation but once the temperature reaches a threshold range, the fluctuations remain within that narrow range.

The invention exploits the thermal inertia of the production fluid and of the pipeline 10 itself to smooth fluctuations in the temperature of the production fluid and to avoid cold spots at which waxes or hydrates are likely to appear. The smoothing effect is enhanced by conduction and convection of heat within the production fluid, by conduction of heat within the wall of the pipeline 10, and by transport of heat along the pipeline 10 by virtue of the flow of the hot production fluid.

Turning finally to FIGS. 8*a* and 8*b*, these drawings show a further embodiment of the invention in which like numerals are used for like features. Again, this is a variant of the arrangement shown in FIG. 1 and, like FIGS. 3*a* to 3*c*, omits the FPSO 18 with its onboard power unit 24 and switchboard 26, and the temperature sensors 28 of FIG. 2.

In this example, the heating system 16 is divided into four sections 16A, 16B, 16C and 16D disposed in longitudinal succession along the pipeline 10. Each of those sections 16A-D is powered independently by the power unit 24 under the control of the switchboard 26 aboard the FPSO 18. Branched power lines 42 extend along the pipeline 10 from the umbilical 22 to the outboard first and fourth sections 16A and 16D adjoining the terminal modules 12.

In FIG. 8*a*, the second and fourth sections 16B and 16D are activated together while the first and third sections 16A and 16C are deactivated. The situation reverses in FIG. 8*b*, where the first and third sections 16A and 16C are both now activated while the second and fourth sections 16B and 16D are deactivated. The cycle continues while production fluid continues to flow along the pipeline 10 and may be adjusted to maintain temperature during a shutdown or to remediate flow in the event of a blockage.

Again, complete deactivation of a section 16A-D as shown is optional. Heating power may instead be reduced and increased cyclically rather than being completely removed from a section 16A-D when being switched through on-off-on-off cycles.

Many other variations are possible within the inventive concept. For example, the transition of power input from one section 16A to a neighbouring section 16B of the heating system 16 need not be a sudden transition as shown. The transition could instead be a ramped or sinuous transition, with a constant or variable rate of change through a transition period.

The relative locations of the power supply umbilical 22, the FSPO 18 and the pipeline 10 can also be modified without departing from the invention. For example, the umbilical 22 can at least partially follow the pipeline 10, freely or connected in a 'piggy-back' arrangement. Further sections can similarly be connected together and more umbilicals may be used to supply power to one or more switchboards 26.

The invention claimed is:

1. A method of operating an electric heating system having at least first and second sections disposed in neighbouring longitudinal succession along a subsea pipeline, the method comprising, in a repeating cycle:

for a first period of time, supplying greater heating power to the first section than to the second section; and then decreasing the level of heating power supplied to the first section while increasing the level of heating power supplied to the second section; and then for a second period of time, supplying greater heating power to the second section than to the first section; and then decreasing the level of heating power supplied to the second section while increasing the level of heating power supplied to the first section, so that the levels of heating power supplied to the first and second sections are in mutually-opposed alternation throughout the cycle.

2. The method of claim 1, comprising deactivating the second section for the first period and deactivating the first section for the second period.

3. The method of claim 1, comprising continuing to supply heating power to the second section for the first period and to the first section for the second period.

4. The method of claim 1, comprising adjusting timing of the cycle in response to measuring temperature of fluid within or flowing from the pipeline.

5. The method of claim 1, comprising adjusting levels of heating power supplied to the first and second sections in response to measuring temperature of fluid within or flowing from the pipeline.

6. The method of claim 1, comprising increasing heating power supplied to the first section while reducing heating power supplied to the second section in a transition between the end of the second period and the beginning of the first period.

7. The method of claim 1, comprising reducing heating power supplied to the first section while increasing heating power supplied to the second section in a transition between the end of the first period and the beginning of the second period.

8. The method of claim 1, comprising varying levels of heating power supplied to the first and second sections throughout the cycle.

9. The method of claim 1, comprising keeping a level of heating power supplied to the first section substantially constant throughout the first period.

10. The method of claim 1, comprising keeping a level of heating power supplied to the second section substantially constant throughout the second period.

11. The method of claim 1, comprising supplying a greater maximum level of heating power to the first section than to the second section.

12. The method of claim 1, comprising maintaining aggregate power supplied to the system at a substantially constant level throughout the cycle.

13. The method of claim 1, comprising powering the first and second sections via an automated subsea switchboard.

14. An electric heating system for a subsea pipeline, the system comprising:

at least first and second heating sections that are disposed in neighbouring longitudinal succession along the pipeline;

a switchboard; and a controller that is configured to control the switchboard to supply power to the first and second sections in a repeating cycle in which: a greater level of heating power is supplied to the first section than to the second section for a first period of time; and then the level of heating power supplied to the first section is decreased while the level of heating power supplied to the second section is increased; and then a greater level of heating power is supplied to the second section than to the first section for a second period of time; and then the level of heating power supplied to the second section is decreased while the level of heating power supplied to the first section is increased, so that the levels of heating power supplied to the first and second sections are in mutually-opposed alternation throughout the cycle.

15. The system of claim 14, wherein the switchboard is on a surface installation.

16. The system of claim 14, wherein the switchboard is at a subsea location.

17. The system of claim 14, wherein the switchboard is configured to operate the cycle autonomously.

18. A subsea pipeline fitted with at least one heating system of claim 14.

19. The pipeline of claim 18, further comprising at least one temperature sensor mounted on or downstream of the pipeline and connected to the switchboard to send production fluid temperature feedback to the switchboard.

20. The pipeline of claim 19, wherein the switchboard is configured to respond to said feedback by adjusting timing of the cycle.

21. The pipeline of claim 19, wherein the switchboard is configured to respond to said feedback by adjusting levels of heating power supplied to the first and second sections.

22. An offshore hydrocarbon production installation comprising at least one pipeline of claim 19.

23. The installation of claim 22, wherein the heating system is powered via an umbilical that extends from a power unit at the surface and connects to the heating system between the first and second sections.

* * * * *